United States Patent [19]

Wood et al.

[11] Patent Number: 4,673,659

[45] Date of Patent: Jun. 16, 1987

[54] LIGHTWEIGHT CONCRETE ROOF TILES

[75] Inventors: John W. M. Wood, Bromley; Richard C. Hack, Sidcup, both of United Kingdom

[73] Assignee: Marley Tile AG, Zurich, Switzerland

[21] Appl. No.: 689,962

[22] Filed: Jan. 9, 1985

[30] Foreign Application Priority Data

Aug. 24, 1984 [GB] United Kingdom ............... 8421605

[51] Int. Cl.$^4$ ................................ C04B 7/02
[52] U.S. Cl. .......................... 106/98; 106/97; 106/314
[58] Field of Search ............... 106/98, 97, 314

[56] References Cited

U.S. PATENT DOCUMENTS

| | | | |
|---|---|---|---|
| Re. 31,682 | 9/1984 | Kjohl et al. | 106/98 |
| 3,232,777 | 2/1966 | Bush | 106/98 |
| 3,677,686 | 7/1972 | Powel | 425/452 |
| 3,880,664 | 4/1975 | Schulze | 106/99 |
| 4,087,285 | 5/1978 | Kurz | 106/98 |
| 4,088,808 | 5/1978 | Cornwell et al. | 428/409 |
| 4,310,486 | 1/1982 | Cornwell et al. | 264/309 |
| 4,384,896 | 5/1983 | Aitcin et al. | 106/288 |
| 4,482,385 | 11/1984 | Satkowski et al. | 106/98 |
| 4,501,830 | 2/1985 | Miller et al. | 106/98 |
| 4,504,320 | 3/1985 | Rizer et al. | 106/98 |
| 4,505,753 | 3/1985 | Scheetz et al. | 106/98 |

FOREIGN PATENT DOCUMENTS

| | | | |
|---|---|---|---|
| 800059 | 5/1980 | European Pat. Off. | 106/98 |
| 56-78476 | 11/1979 | Japan | 106/98 |
| 58-15086 | 7/1981 | Japan | 106/98 |
| 2148871A | 10/1984 | United Kingdom . | |

OTHER PUBLICATIONS

European Search Report, EP 85306036.6, Nov. '85, (2 pp.).

Search Report, Appl. No. 8521125, Oct. '85, (1 p.)

*Primary Examiner*—William R. Dixon, Jr.
*Assistant Examiner*—A. Knab
*Attorney, Agent, or Firm*—Bacon & Thomas

[57] ABSTRACT

Lightweight concrete roof tiles are produced by extruding a cement/lightweight aggregate/water mix containing a non-thixotropic silica fume in a weight ratio of silica fume (calculated as dry weight) to cement of about 2:98 to about 25:75, preferably about 8:92 to about 12:88. The presence of non-thixotropic silica fume in the mix enables lightweight roof tiles of adequate flexural strength to be obtained from the mix by extrusion. Novel cement/lightweight aggregate/water mixes containing non-thixotropic silica fume and novel roof tiles prepared therefrom are also described.

13 Claims, No Drawings

LIGHTWEIGHT CONCRETE ROOF TILES

This invention relates to the production of concrete roof tiles by an extrusion method and is particularly concerned with such a method of production which provides lightweight concrete roof tiles of a kind which are for example useful as a replacement for wood shingles and shakes, asphalt shingles, asbestos cement roofing, slates, etc.

It is well known to produce concrete roof tiles by an extrusion method comprising forming a mix of cement, sand and water, extruding the mix by the well-known roller and slipper method, cutting the extrudate to provide sections of the required length and curing at elevated temperatures under conditions of high humidity. Roof tiles of essentially flat and of convoluted constructions are made in this way and typically have densities of from 2.1 to 2.2 g/cc. Interlocking roof tiles having the usual dimensions for the United States of America of about 422 mm length×333 mm width×11.5 to 12.5 mm thickness generally have a weight in the range of from 4.2 to 5.0 kg per tile, strengthening ribs, nibs and weatherchecks which are provided on the undersides of concrete interlocking roof tiles adding to the overall weight.

It is recognised that concrete roof tiles of the kind described above provide a satisfactory and highly durable roofing material and they are extensively used for the roofing of new houses and other buildings. For re-roofing, however, there is frequently a problem in that the roofing material to be replaced may be a lighter weight roofing material such as for example wood shingles and shakes, asphalt shingles, asbestos cement roofing, slates, etc. and the building concerned may be incapable of bearing the additional load which would result from re-roofing with conventional concrete roof tiles. Thus, for example, with timber framed buildings, it may be necessary to reinforce the existing roof timbers to ensure that they will bear the additional load. This is costly and in practice often results in a decision not to utilise concrete roof tiles for re-roofing work.

There is thus a need for a concrete roof tile which is lighter in weight than conventional concrete roof tiles of the kind described above but which has adequate strength and durability whereby it is suitable for use as a replacement for wood shingles and shakes, asphalt shingles, asbestos cement roofing, slates, etc.

It is known that the weight of concrete can be reduced by the use of lightweight aggregates as a partial or complete substitute for sand. Numerous lightweight aggregates have been proposed for this purpose including naturally occurring materials such as pumice and scoria and materials produced by manufacturing processes such as sintered pulverised fuel ash (e.g. available as Lytag from Pozzolanic-Lytag Limited of Hemel Hempstead, Hertfordshire, England) and expanded materials such as expanded clay, shale, slate, vermiculite and perlite. In general, however, the use of such lightweight aggregates in order to obtain a lower weight concrete results in a reduction in flexural strength and consequently, in order to obtain a concrete roof tile of adequate flexural strength, it is necessary to increase the thickness of the tiles made of such lightweight concrete as compared with that of a conventional concrete roof tile to such an extent that no worthwhile weight advantage is achieved.

It is an object of the present invention to provide a method of producing concrete roof tiles which are substantially lighter in weight than conventional concrete roof tiles but which have comparable flexural strength.

Another problem which has arisen in attempting to produce concrete roof tiles by extrusion using lightweight aggregates as a substitute for sand is caused by the consequent change in the rheological properties of the mix. In order to produce a satisfactory concrete roof tile by extrusion, it is important that the mix should flow evenly through the extruder (otherwise known as the box) as otherwise there are likely to be difficulties with uneven compaction, rough and open surfaces on the wear side of the tiles and poor definition of interlocks, upstands, nibs and weatherchecks on the under side of the tiles. Also the mix must have a sufficient degree of cohesion so that cracks do not form in the extrudate, e.g. upon cutting into sections of the required length for use as roof tiles. While it may be possible to improve the cohesion of the extrudate by increasing the amount of water in the mix, this may also result in a greater tendency for the mix to adhere to the equipment with which it comes into contact during the manufacturing process, e.g. the blades and sides of the mixer, conveyor belting, the extruder (i.e. the box), etc. Also the use of wetter mixes can result in slumping of the extruded tiles, for example upon cutting and when they are in the process of being transferred to a curing chamber. While conventional cement/sand/water mixes having satisfactory rheological properties can be prepared, it has been found that the replacement of sand by lightweight aggregates modifies the rheology of the mix and that as a result the correct balance of rheological properties which is essential to the production of a satisfactory extruded concrete roof tile is no longer attainable. This has led to the proposal to replace only part of the sand used in the conventional mix by lightweight aggregate, thereby achieving a mix having a balance of rheological properties closer to that of a conventional cement/sand/water mix, but this leads to a reduction in the weight advantage.

It has been proposed in U.S. Pat. No. 3,880,664 that, when it is desired to make lightweight concrete products and more particularly such products made from asbestos cement, the percentage of water in the mix should be greatly increased with the addition of fumed silica and with the other ingredients in the mixture being relatively decreased and/or replaced with lightweight materials such as perlite and the like (see particularly col. 5, lines 7-12). The silica fume used is highly thixotropic so that, while the mix obtained is very fluid and pliable when being worked and extruded to produce the desired concrete products, immediately upon the cessation of the shear forces applied and emergence of the extrudate from the die the article obtained holds its shape (see col. 4, lines 31-45). The use of a greatly increased percentage of water in conjunction with the addition of a highly thixotropic silica fume is however unsuitable for the production of lightweight concrete roof tiles of adequate flexural strength.

It is a further object of the present invention to provide a cement/lightweight aggregate/water mix having advantageous rheological properties for extrusion to provide lightweight concrete roof tiles of adequate flexural strength.

The present invention is based upon the discovery that the incorporation into a cement/lightweight aggregate/water mix for use in the production of concrete roof tiles by extrusion of a non-thixotropic silica fume has surprising advantages in that it provides a mix having advantageous rheological properties for the purposes of extrusion without the need for the presence of a greatly increased percentage of water in the mix and also the mix can be extruded to provide very satisfactory lightweight concrete roof tiles of adequate flexural strength.

According to one feature of the present invention, there is thus provided a method of producing concrete roof tiles by extruding a cement/lightweight aggregate/water mix, dividing the extrudate to provide sections and curing; said mix additionally containing an amount of a non-thixotropic silica fume which is effective to improve the flexural strength of the roof tiles.

According to a further feature of the present invention, there is provided a cement/lightweight aggregate/water mix for use in a method of producing concrete roof tiles by extrusion; said mix additionally containing an amount of a non-thixotropic silica fume which is effective to improve the rheological properties for the purposes of extrusion.

According to a still further feature of the present invention there is provided a lightweight concrete roof tile which has been produced by extrusion and which contains the reaction products of a non-thixotropic silica fume with lime; said tile having a density of from about 1.2 to about 1.6 g/cc and said reaction products contributing to the flexural strength of the tile.

According to a yet still further feature of the present invention there is provided a lightweight concrete roof tile which has been produced by extruding a cement/lightweight aggregate/water mix which additionally contains an amount of a non-thixotropic silica fume which is effective to improve the flexural strength of the roof tile.

Silica fumes are known materials which can be thixotropic or non-thixotropic according to the method used for their preparation. An example of a thixotropic silica fume is the product "Cab-O-Sil" as referred to in U.S. Pat. No. 3,880,664, this product being prepared by a vapour phase process involving the hydrolysis of silicon tetrachloride at about 1100° C. "Cab-O-Sil" is highly thixotropic with 10%, 22% and 33% by weight mixtures with water giving a gel, a sticky powder and a free-flowing powder respectively.

The expression 'non-thixotropic silica fume' is used herein to define silica fumes which in the form of a 50% by weight mixture with water give a free flowing liquid slurry.

One known method of producing non-thixotropic silica fumes is as a by-product in electric arc furnaces used for the production of silicon metal and ferrosilicon alloys. At the high temperatures reached in the formation of silicon metal and ferrosilicon alloys, silicon monoxide gas is formed by the reduction of quartz and is then re-oxidised to silica at the lower temperatures above the charge. The silica thereby obtained is condensed as fume and can be recovered by filtration. The non-thixotropic silica fume obtained consists of extremely fine, essentially spherical particles of amorphous silica, the mean average particle size typically being in the range of from about 0.05 to about 0.15 micrometer, e.g. about 0.1 micrometer, and the surface area typically being in the range of from about 15 to about 25 $m^2/g$, e.g. about 20 $m^2/g$. The exact chemical composition of the non-thixotropic silica fume can vary somewhat according to the precise method of production and for example three grades of non-thixotropic silica fume are available as ELKEM SILICA 100, ELKEM SILICA 90 and ELKEM SILICA 75 from Elkem Chemicals of Pittsburg, Pa., U.S.A. In general any of these grades of non-thixotropic silica fume, all of which have a high silica content within the range of from 85 to 98% by weight, is suitable for use in the present invention.

In order to prepare cement/lightweight concrete/water mixes according to the invention having improved rheological properties for the purpose of producing concrete roof tiles by extrusion, it is desirable to incorporate the non-thixotropic silica fume into the mix in admixture with a dispersing agent. Suitable dispersing agents include lignosulfonates, naphthalene sulfonate superplasticisers and melamineformaldehyde superplasticisers, examples of such dispersing agents being CORMIX P1 lignosulfonate dispersing agent available from Cormix Limited, Warrington, Cheshire, England, CORMIX SP1 naphthalene sulfonate superplasticiser also available from Cormix Limited and MELMENT L10 melamine-formaldehyde superplasticiser available from Hoechst UK Limited of Hounslow, Middlesex, England. Where for example a lignosulfonate dispersing agent is used, the amount of dispersing agent is conveniently within the range of from about 2.0 to about 5.0% based upon the dry weight of the non-thixotropic silica fume. The dispersing agent and the non-thixotropic silica fume are conveniently combined in the form of an aqueous slurry, for example containing the silica fume and water in a ratio of about 1:1 by weight. Silica fume/dispersing agent mixes are sometimes referred to as plasticised silica fumes and one such product suitable for use in the present invention is that available as EMSAC F110 from Elkem Chemicals.

The amount of non-thixotropic silica fume incorporated into the cement/lightweight aggregate/water mix should be effective to improve the flexural strength of the roof tiles obtained. It has been found that the use of weight ratios of non-thixotropic silica fume (calculated as dry weight) to cement of about 2:98 to about 25:75, more preferably about 8:92 to about 12:88, provides a very substantial improvement in the flexural strength of the roof tiles obtained. Moreover, and very surprising having regard to problems hitherto encountered when extruding cement/lightweight aggregate/water mixes, the use of such amounts of plasticised non-thixotropic silica fume has been found to provide mixes having advantageous rheological properties for the purpose of producing concrete roof tiles of adequate flexural strength by extrusion. In general the use of smaller amounts of plasticised non-thixotropic silica fume may give a reduced advantage while the use of larger amounts of plasticised non-thixotropic silica fume may not provide significant further advantages.

As stated above, available lightweight aggregates include naturally occurring materials such as pumice and scoria and materials produced by manufacturing processes such as sintered pulverised fuel ash and expanded materials such as expanded clay, shale, slate, vermiculite and perlite. In selecting the lightweight aggregate, it is important that the material concerned in combination with the other ingredients shall give a mix having the best possible rheological properties for extrusion. It has been found that expanded clay aggregate is particularly suitable for this purpose. While the simple substitution of sand in a conventional cement/sand/water mix by an equal volume of expanded clay aggregate provides a mix with very poor rheological properties not at all suitable for extrusion to produce satisfactory roof tiles, it has surprisingly been found that the use of expanded clay as lightweight aggregate in mixes according to the invention which contain plasticised non-thixotropic silica fume provides mixes having very advantageous properties for extrusion. Thus, using such mixes, it has been found possible by the method of the invention to produce well compacted tiles with a satisfactory smooth wear surface and with clearly defined interlocks, upstands, nibs and weatherchecks. Also the use of a greatly increased percentage of water in the mix is not necessary and there is no problem in producing mixes which have a sufficient degree of cohesion to avoid the risk of cracks forming in the extrudate e.g. upon cutting but which do not have any greater tendency to adhere to the equipment with which they come into contact during the extrusion process than do the conventional cement/sand/water mixes.

Other advantages which have been observed using expanded clay as lightweight aggregate in mixes according to the invention are the avoidance of any significant tendency for the extruded tiles to slump, for example upon cutting or when they are in the process of being transferred to a curing chamber; reduction of the common problem of abrasion of the slipper as a result of contact with the mix with consequent deterioration in the surface appearance of the tiles, the use of the mixes according to the invention having the beneficial effect of polishing the surface of the slipper thereby resulting in an improvement in the surface appearance of the tiles; and the possibility of extruding at lower pressures as a result of the advantageous rheological properties of the mixes according to the invention thereby reducing wear on the extruder.

The expanded clay which is preferably used in accordance with the invention is a sand-grade material, i.e. has a particle size of less than about 4.75 mm, and advantageously has a particle size distribution approximating to that of the sand used in conventional mixes for the production of concrete roof tiles by extrusion. Expanded clay aggregate meeting these requirements can be produced by an extrusion and chopping method. Fine sand-grade material having a particle size of less than about 3.35 mm is particularly preferred and one such material having a suitable particle size distribution is that available as RIDGELITE No. 3 FINE SAND from Lightweight Processing Co. of Glendale, Calif., U.S.A.

Other lightweight aggregate materials may be used instead of expanded clay, dependant however upon the availability of appropriate grades of such materials. One such material is expanded shale. Examples of other such materials are sintered pulverised fuel ash and pumice. Again sand-grades of these materials, having a particle size of less than about 4.75 mm and advantageously particle size distributions similar to that of the sand used in conventional mixes, are preferably used.

The ratio by weight of lightweight aggregate to cementitious materials (including the cement and the silica fume) is preferably in the range of about 1:1 to about 3:1, more preferably about 1.5:1 to about 2.5:1. In general, the lighter the aggregate the lower will be the weight ratio of aggregate to cementitious materials. Where for example expanded clay is used as the lightweight aggregate, the weight ratio of expanded clay to cementitious materials is preferably about 2:1.

It has been possible using a method according to the invention to produce concrete roof tiles having densities of from about 1.2 to about 1.6 g/cc, for example about 1.3 to about 1.5 g/cc, and having a weight per tile down to about 55% of the weight of conventional concrete roof tiles but with comparable flexural strength. Because of the improvement in flexural strength resulting from the presence of the reaction products of plasticised non-thixotropic silica fume and lime, the desired flexural strength is obtained with reduced thicknesses as compared with the usual thickness for conventional roof tiles and the reduction in thickness as well as the lightweight aggregate contribute to the overall up to 45% reduction in the weight of the tile. The tiles in accordance with the present invention preferably have a minimum thickness of from about 9 to about 12 mm, particularly about 10 to about 11 mm.

It is an advantage of the method according to the invention that it can conveniently be carried out using conventional equipment and conditions as employed in the well-known roller and slipper method. The cement used is conveniently ordinary Portland cement which is mixed with the lightweight aggregate, the non-thixotropic silica fume (preferably in the form of a plasticised non-thixotropic silica fume slurry) and water to form the mix. The amount of water required in order to obtain an extrudable mix will in general be greater than that required for conventional mixes which contain sand as aggregate due to the porous character of most lightweight aggregates but need not be greatly increased. Thus the amount of water in the mix is preferably from about 12 to about 24% by weight, for example about 16 to about 19% by weight. The weight ratio of water: cementitious materials is preferably in the range of from about 0.45:1 to about 1:1, for example about 0.6:1 to about 0.8:1.

Pigments may be incorporated in the mix in order to provide roof tiles of the desired colour. The mix can be extruded, cut and cured precisely as in the well-known roller and slipper method, curing conveniently being carried out at temperatures of from 35° C. to 65° C., preferably about 50° C., for at least 8 hours, preferably from 12 to 24 hours, under conditions of high humidity. Whilst it is not desired to be restricted by any theoretical explanation for the working of the invention, it is believed that during curing an additional chemical reaction takes place between the silica fume and lime released as a result of the hydration of the cement and that the calcium silicate hydrates thereby formed contribute to the strength of the roof tiles produced.

The following examples illustrate the invention:

EXAMPLE 1

909 kg of moist RIDGELITE No 3 FINE SAND (water content of about 18% by weight), 335 kg of Portland cement, 82.7 kg of EMSAC F110 and 13 kg of a synthetic red oxide pigment were mixed in a rotary pan mixer with sufficient water to provide an extrudable mix containing about 18% by weight of water. The mix was used to extrude concrete roof tiles on metal pallets by the well-known roller and slipper method, the settings on the extruder (i.e. the box) being adjusted to provide a tile thickness of about 10.5 mm. On extrusion, it was found that good quality convoluted interlocking tiles were formed with a satisfactorily smooth surface, well formed and defined interlocks and well filled and formed nibs and weatherchecks on the bottom surface of the tiles. Approximately 420 tiles of dimensions 422 mm×333 mm× about 10.5 mm were made from this mix. These tiles were transported to curing cabinets where they were cured at 50° C. and 95-100% Relative Humidity for a period of 10 hours. After curing, the tiles were removed from the metal pallets and allowed to stand in stacks in the open for a period of 7 days. Sample tiles were then selected at random, weighed and tested for flexural strength by the method specified in British Standard No. 473550.

Average weight per tile—2.72 kg
Average flexural strength—2070 N

EXAMPLE 2 (for comparison)

1227 kg of damp silica sand (water content of about 3% by weight), 373 kg Portland cement and 13 kg of a synthetic red oxide pigment were mixed in a rotary pan mixer with sufficient water to provide an extrudable mix containing about 9% by weight water. The mix was used to extrude concrete roof tiles on metal pallets as in Example 1, the settings on the extruder (i.e. the box) being adjusted to provide a tile thickness of about 12 mm. On extrusion, it was found that good quality convoluted interlocking tiles were made, with a satisfactorily smooth surface, well formed and defined interlocks and well filled nibs and weatherchecks on the bottom surface of the tiles. Approximately 360 tiles, of dimensions 422 mm×333 mm× about 12 mm and of the same convoluted shape as the tiles in Example 1, were made from this mix. These tiles were transported to curing cabinets where they were cured at 50° C. and 95-100% Relative Humidity for a period of 10 hours. After curing, the tiles were removed from the metal pallets and allowed to stand in stacks in the open for a period of 7 days. Sample tiles were then selected at random, weighed and tested for flexural strength by the method specified in British Standard No. 473550. The results obtained were as follows:

Average weight per tile—4.60 kg
Average flexural strength—2100 N

EXAMPLE 3 (for comparison)

909 kg of moist RIDGELITE No. 3 FINE SAND (water content of about 18% by weight), 373 kg of Portland cement and 13 kg of a synthetic red oxide pigment were mixed in a rotary pan mixer with sufficient water to provide an extrudable mix containing about 18% by weight of water. The mix was used to extrude concrete roof tiles on metal pallets as in Example 1, the settings on the extruder (i.e. the box) being adjusted to provide a tile thickness of about 10.5 mm. On extrusion it was found that the tiles could not be satisfactorily formed and that they exhibited a rough and 'open' surface texture, highly feathered and broken interlocks and incomplete filling of the nib and weathercheck sections on the bottom surface of the tiles. Attempts to repeat the above but using different levels of water addition were unsuccessful and no tiles were of sufficiently satisfactory quality for strength tests to be carried out.

A comparison of Example 1 in accordance with the present invention and Example 2 in accordance with conventional practice shows that it is possible by means of the present invention to produce concrete roof tiles which have substantially the same flexural strength as those produced by a conventional method but which have a reduced thickness and a weight which is only about 60% of that of tiles produced by the conventional method.

A comparison of Example 1 in accordance with the present invention and Example 3 in which the same lightweight aggregate is used but without the presence of silica fume shows the advantage which is provided by the use of a cementitious mixture containing silica fume and cement in a weight ratio of about 1:9 as compared with the use of cement alone as the cementitious material.

EXAMPLE 4

636 kg of moist Baypor sand (an expanded shale having a water content of about 11% by weight available from Port Costa Materials Inc of Port Costa, Calif., USA), 273 kg of Portland cement, 67 kg of EMSAC F110 and 10 kg of a synthetic red oxide pigment were mixed in a rotary pan mixer with sufficient water to provide an extrudable mix containing about 15% by weight of water. The mix was used to extrude concrete roof tiles on metal pallets by the well-known roller and slipper method, the settings on the extruder (i.e. the box) being adjusted to provide a tile thickness of about 10.5 mm. On extrusion it was found that good quality convoluted interlocking tiles were formed with a satisfactory smooth surface, well formed and defined interlocks and well filled and formed nibs and weatherchecks on the bottom surface of the tiles. Approximately 285 tiles of dimensions 422 mm×333 mm× about 11 mm were made from this mix. These tiles were transported to curing cabinets where they were cured at 50° C. and 95-100% Relative Humidity for a period of 12 hours. After curing, the tiles were removed from the metal pallets and allowed to stand in stacks in the open for a period of 7 days. Sample tiles were then selected at random, weighed and tested for flexural strength by the method specified in British Standard No. 473550.

Average weight per tile—3.44 kg
Average flexural strength—2192 N

We claim:

1. In a method of producing concrete roof tiles in which a mix comprising cement/aggregate/water is shaped by the roller and slipper method to obtain a shaped extrudate which is divided to form sections and the sections are cured; wherein the improvement comprises the use of a lightweight aggregate in said cement/aggregate/water mix, said mix additionally containing a non-thixotropic silica fume in a weight ratio of silica fume, calculated as dry weight, to cement within the range of from about 2:98 to about 25:75, an effective amount of a dispersing agent for said silica fume, and the weight ratio of water:cementitious materials in said mix being within the range of from about 0.45:1 to about 1:1, to form lightweight concrete roof tiles.

2. A method according to claim 1 wherein the non-thixotropic silica fume has a mean average particle size in the range of from about 0.05 to about 0.15 micrometer and a surface area in the range of from about 15 to about 25 m$^2$/g.

3. A method according to claim 1 wherein the lightweight aggregate comprises a sand-grade expanded clay having a particle size of less than about 4.75 mm.

4. A method according to claim 3 wherein the particle size of the sand-grade expanded clay is less than about 3.35 mm.

5. A method according to claim 1 wherein the weight ratio of non-thixotropic silica fume (calculated as dry weight) to cement is from about 8:92 to about 12:88.

6. A method according to claim 1 wherein the amount of water in said mix is from about 12 to about 24% by weight.

7. A method according to claim 1 wherein the weight ratio of water:cementitious materials in said mix is in the range of from about 0.6:1 to about 0.8:1.

8. A method according to claim 1 wherein the dispersing agent is a lignosulfonate dispersing agent.

9. A method according to claim 1 wherein the dispersing agent is a naphthalene sulfonate superplaticizer.

10. A method according to claim 1 wherein the silica fume is a silica fume produced as a by-product of an electric arc furnace process for the production of silicon metal and ferrosilicon alloys.

11. A lighweight concrete roof tile which has been produced by the roller and slipper method and which contains the reaction products of a nonthixotropic silica fume with lime; said tile having a density of from about 1.2 to about 1.6 g/cc and said reaction products contributing to the flexural strength of the tile.

12. A roof tile according to claim 11 having a density of from about 1.3 to about 1.5 g/cc.

13. A cement/aggregate/water mix for use in the production of lightweight concrete roof tiles by the roller and slipper method; the aggregate in said mix comprising lightweight aggregate, said mix additionally containing a non-thixotropic silica fume in a weight ratio of silica fume, calculated as dry weight, to cement within the range of from about 2.98 to about 25:75, a dispersing agent for said silica fume, and the weight ratio of water:cementitious materials in the said mix being within the range of from about 0.45:1 to about 1:1.

* * * * *